United States Patent [19]

Lawrence

[11] Patent Number: 4,515,289
[45] Date of Patent: May 7, 1985

[54] HOPPER FEED MECHANISM FOR RADIAL LEAD DEVICES

[75] Inventor: Merlin Lawrence, Fairview, Pa.

[73] Assignee: Automated Industrial Systems, Erie, Pa.

[21] Appl. No.: 431,036

[22] Filed: Sep. 30, 1982

[51] Int. Cl.³ .............................................. B65G 59/06
[52] U.S. Cl. ........................................ 221/13; 221/21; 221/236; 198/722; 414/131
[58] Field of Search ................ 221/7, 13, 15, 21, 176, 221/236; 198/624, 722; 414/131, 129

[56] References Cited

U.S. PATENT DOCUMENTS

| | | | |
|---|---|---|---|
| 2,627,969 | 2/1953 | Darner et al. | 198/624 |
| 2,699,862 | 1/1955 | Walter | 414/131 X |
| 2,788,156 | 4/1957 | Cruzan | 221/236 X |
| 3,200,934 | 8/1965 | Payn et al. | 221/236 X |
| 3,844,394 | 10/1974 | Hale et al. | 221/15 |

Primary Examiner—F. J. Bartuska
Attorney, Agent, or Firm—Charles L. Lovercheck; Wayne L. Lovercheck; Dale R. Lovercheck

[57] ABSTRACT

Applicant has provided a hopper feed mechanism used to feed articles into other process equipment. The operator feeds the articles into the hopper. Upon actuation, a shuttle blade conveys an article out of the hopper and under a feedwheel. The shuttle blade is movably supported to the fixed frame of the mechanism, and is powered by an air cylinder. The feedwheel is lifted as the article is propeled under the feedwheel and is lowered to feed the article into other process equipment.

16 Claims, 5 Drawing Figures

HOPPER FEED MECHANISM FOR RADIAL LEAD DEVICES

OBJECTS OF THE INVENTION

It is an object of the invention to provide an improved mechanism to feed articles into other process equipment.

Another object of the invention is to provide an improved mechanism for properly orienting articles being fed into other process equipment.

Another object of the invention is to provide a mechanism to feed articles into other process equipment that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 2:
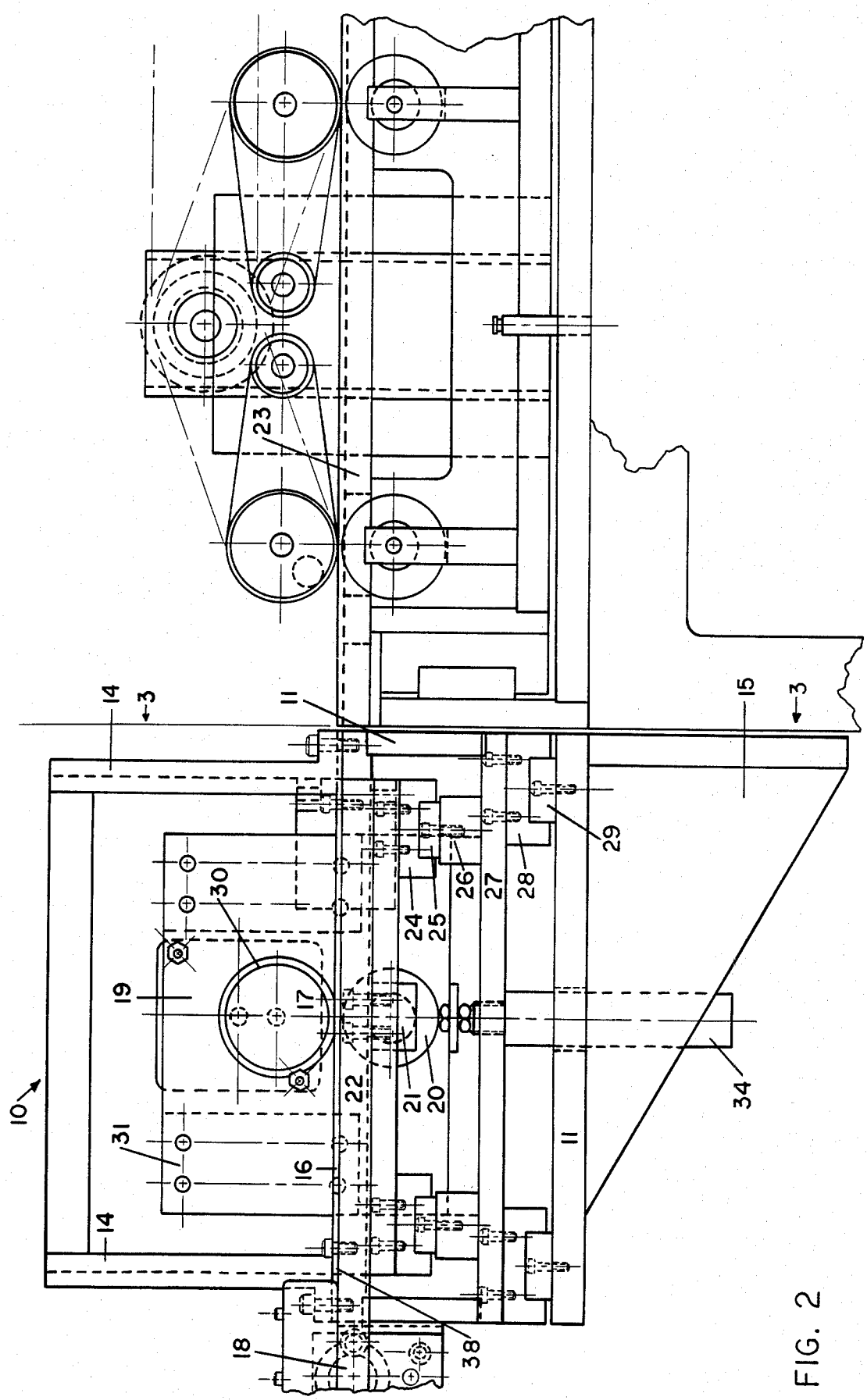
FIG. 2 is a partial enlarged front view of the invention.
Figure 3:
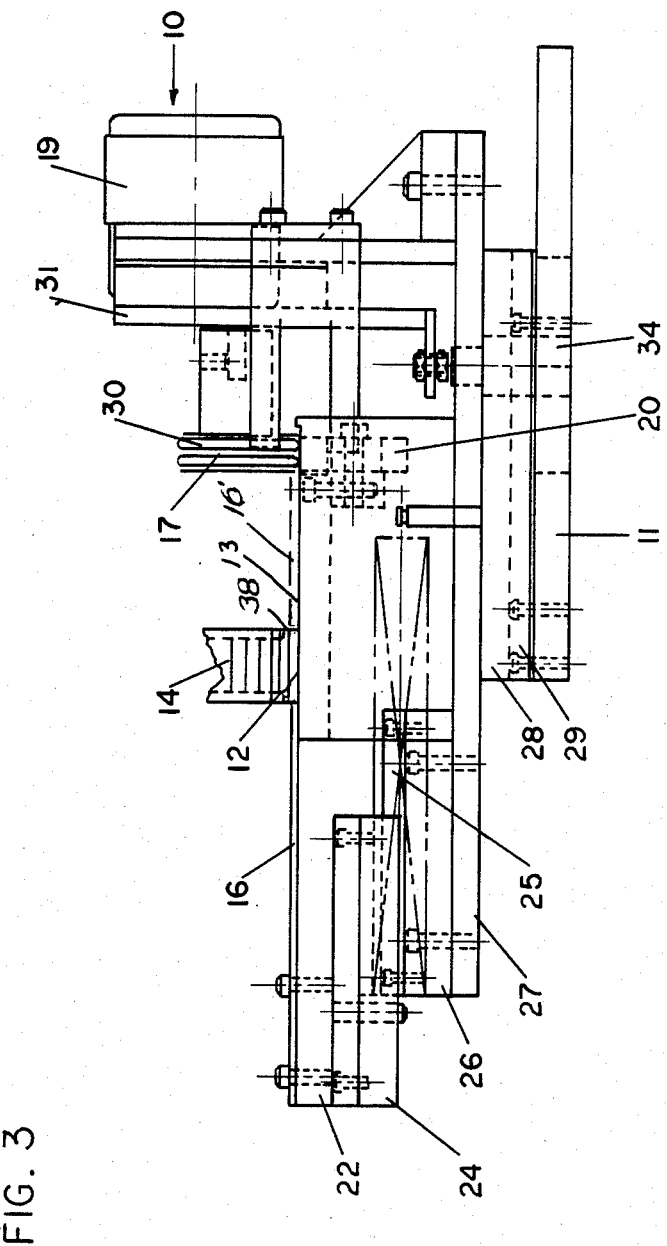
FIG. 3 is a cross sectional view of the invention taken on line 3—3 on FIG. 2.
Figure 4:
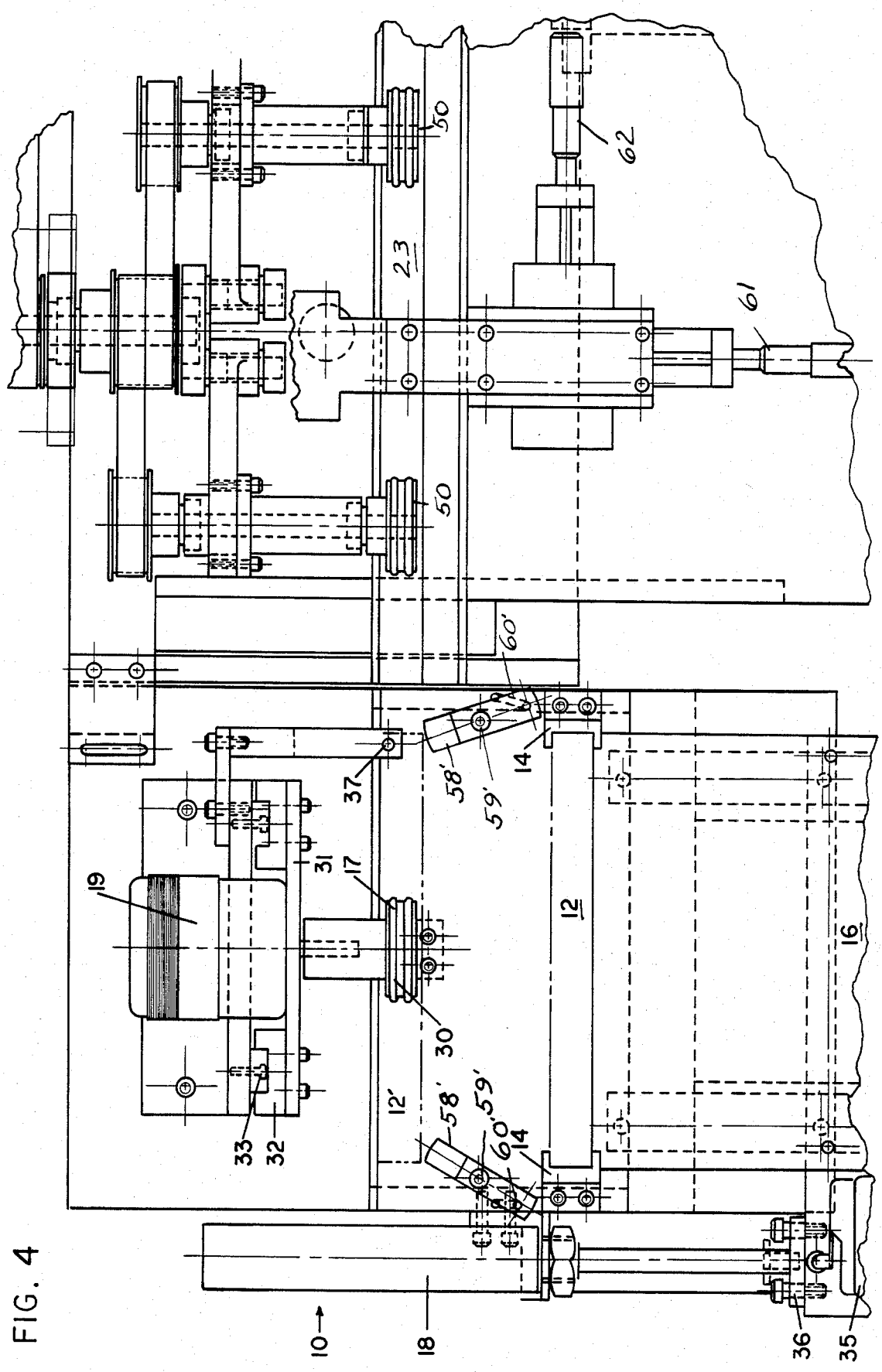
FIG. 4 is a top view of the invention.

The hopper feed mechanism 10 is used to automatically feed articles 12 such as strips of radial leaded electronic components into other process equipment. With more particular reference to the drawings, the hopper feed mechanism 10 is disclosed having a frame 11 which may be fixed onto other process equipment such as the marking machine 13. The operator loads the articles into the hopper which has upright side members 14. The upright members 14 are in the form of channel members and each have a U-shaped space as shown in FIG. 4 which receives the ends of the plate like articles 12. The legs of the channels terminate above the upright members 14 terminate above the plane of the track 23 to provide a space 38 shown on FIG. 2 through which a shuttle blade 16 can move to position 16' and push the lower most article 12 from the stack of articles between the side members of the hopper to the position under feed wheel 17.

The shuttle blade 16 is of approximately the same width as the length of said article and is movably supported on the frame 11 and moves under the lower ends of the legs of the U-shaped uprights which are cut away so that it can move the lower article from the stack. The shuttle blade 16 is carried on a suspension assembly made up of first support plate 22, gibs 24, tracks 25, rods 26, support plate 27 and gibs 28. Gibs 28 slide on the track 29 which is fixed to the frame. The first plate support 22 comprises two plates and is attached to the bottom of the shuttle blade 16. The underside of the first plate support 22 is also connected to the first set of gibs 24. The gibs 24 slide along the first set of tracks 25 which are fixed to rod supports 26. The rod supports 26 are fixed to a second plate support 27 which has the second set of second gibs 28 attached to it. The second set of gibs 28 slide along a second set of tracks 29 which are fixed to the frame of the mechanism 11. The assembly operates like the familiar drawer suspension on office file cabinets. The plate 22 with the shuttle blade 16 moves toward the track until a limit stop on gibs 24 is engaged. Then gibs 24 move forward on rod supports 26 and plate 27 and gibs 28 until gibs 28 engage a stop on track 29.

Feedwheel 17 and idler wheel 20 are each supported at its end remote from the hopper so that the articles can be moved axially to a position between the wheels from the hopper since the wheels are supported from one end only.

Figure 1:
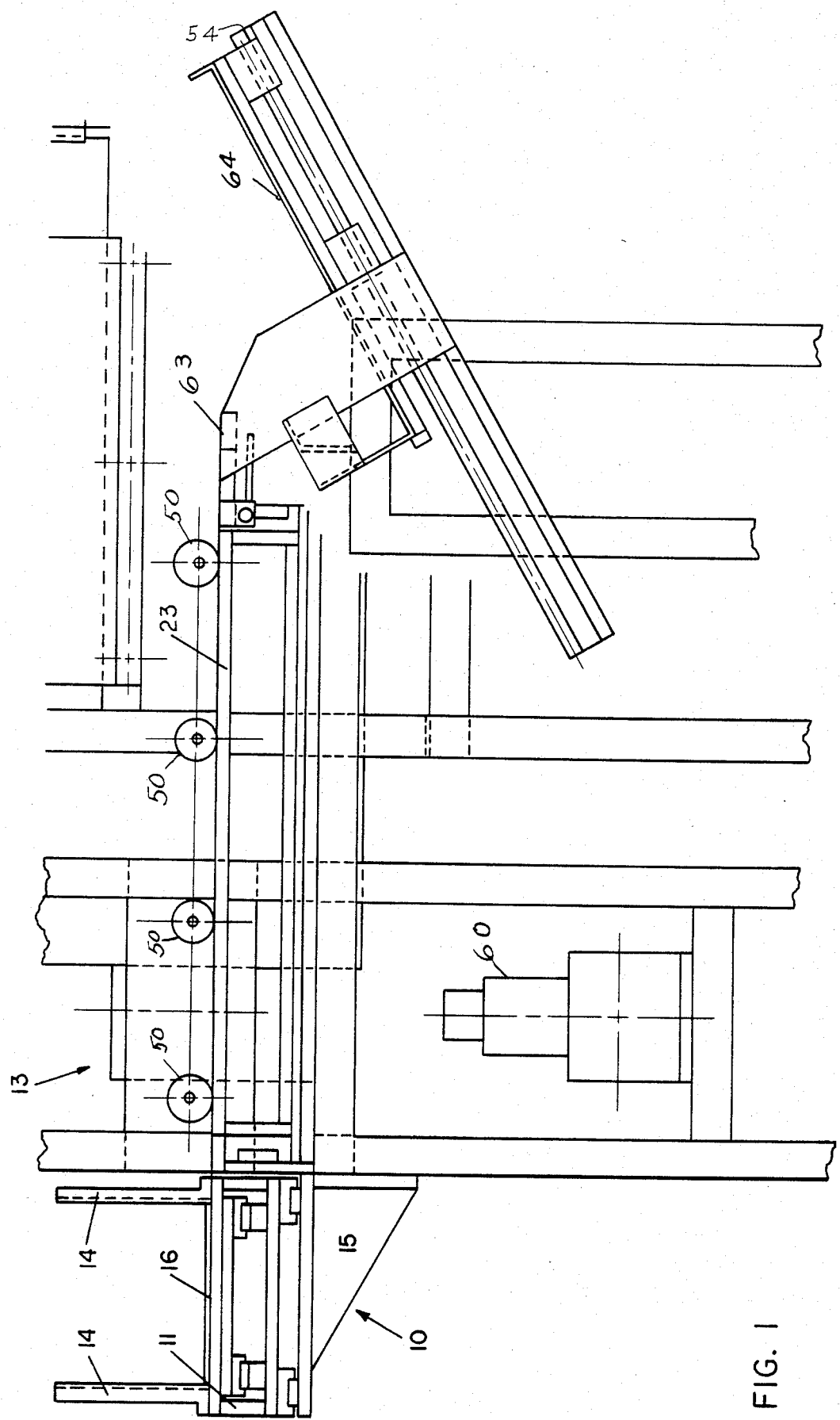
FIG. 1 is a front view of the machine according to the invention.

The shuttle blade 16 is reciprocated by air cylinder 18. It pushes the article out of the hopper 14 and between feedwheel 17 and idler wheel 20. Motor 19 powers feedwheel 17. Both motor 19 and feedwheel 17 are movably supported on the hopper feed mechanism, thus feedwheel 17 and shuttle blade 16 are lifted while the shuttle blade 16 positions an article 12 under the feedwheel 17. Then as the shuttle blade retracts the feedwheel 17 is lowered. The article is then positioned between the feedwheel 17 and the idler wheel 20 which is under the feedwheel and is fixed on the frame 11. Friction rings 30 are attached to the circumference of the feedwheel 17 to contact the article positioned between the feedwheel and idler wheel 20 and the strip is pinched tightly against the idler wheel 20 in order to propel the article 12 into other process equipment along track 23 shown in FIG. 1. The feedwheel 17 and motor 19 are lifted and lowered by means of air cylinder 34 which exerts a force on the support 31 which is connected to gibs 32 shown on FIG. 4. The gibs 32 slide on tracks 33 which are fixed to the frame 11 of the hopper feed mechanism. The feedwheel 17 and motor 19 are supported on gibs 32 by support 31 and are lifted when the gibs are pushed along the tracks 33. Detents 58 are pivoted at 59 and spring loaded to the position shown by springs 60. These detents may optionally be used to hold the parts straight and guide them onto track 22.

Microswitch 35 is used to detect any jams which may occur in feeding. If at any time switch actuator 36, which is connected to the piston rod of cylinder 18, opens, the cylinder is immediately reversed, thus reversing the shuttle blade 16, and the feed cycle is stopped.

Electric eyes 37 are used to ensure that a part is fed each time the shuttle blade cycles. If a part is not fed for any reason, the beam of light to photocell 37 will not be interrupted and contact 37 will not close to actuate the start coil or cylinder 18 the system will automatically stop.

Figure 5:
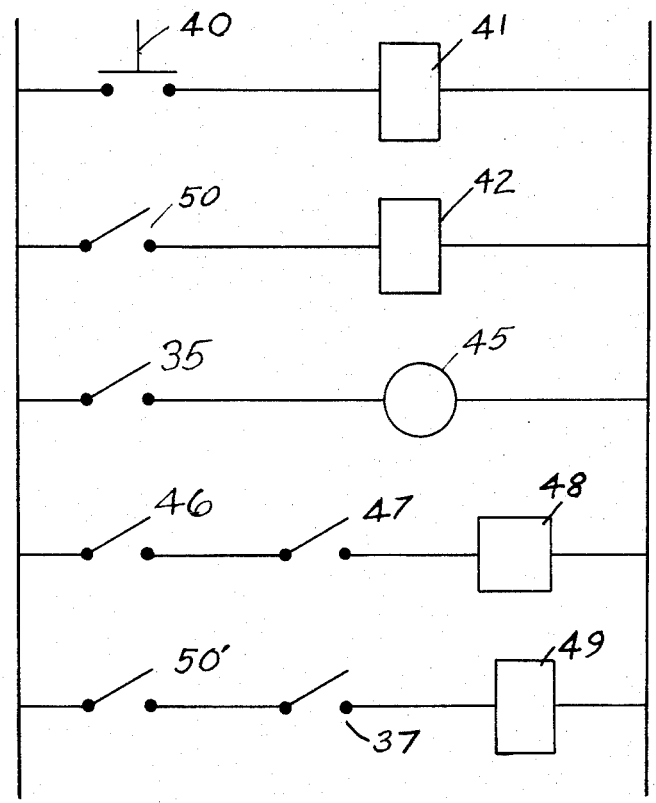
FIG. 5 is a wiring diagram for the controls of the machine.

FIG. 5 shows a wiring diagram for the hopper load section of the machine.

The motors 19 and the motor driving the feedwheel 50 operates at all times. When it is desired to load articles from the hopper to the shuttle mechanism the operator pushes the start button 40 which energizes the coil 41 on the valve supplying air to cylinder 18 to move the shuttle plate 12 toward the wheel 30 thereby pushing the bottom most article 12 from the hopper 14 and moving it toward the wheel 30. At the same time the air valve to cylinder 34 will be energized causing it to lift the wheel 30 away from the idler wheel 20 thereby allowing the part 12 to move between the wheel 30 and the idler wheel 20. When the article being loaded engages the reed switch 50' which energizes the stop coil 42 supplying air to the cylinder 19 and reverses the flow of air to the cylinder 18 thereby causing the cylinder 18 to retract the shuttle blade to the position to start another cycle.

In the event that there is a jam in parts being loaded, the part will engage the microswitch 35 which will actuate relay 45 closing its contact 45 and at the same time the jammed part will intercept the light from the Photocell 37 this will start the timer 48 and if the shuttle plate has not been retracted in a predetermined time set on the timer 48 the timer will close the switch 50. Therefore there will be a circuit completed through switch 50 and 51 to the start coil 49 on the cylinder 18 which will emit air to the cylinder which will cause it to retract and not operate again until the jam has been cleared, thus stopping the feed cycle.

As the part is moved down the track from 23 past laser marker 60 the position of the marker relative to the part on the track can be adjusted by micrometer means 61 and 62. The parts will be discharged at 63 to strip stacker 64 which may be made like the stacker disclosed in U.S. patent application Ser. No. 395,715 filed July 6, 1982.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A mechanism used to feed articles into other process equipment, comprising,
   a frame,
   a track on said frame for slidably supporting articles from a hopper,
   hopper means on said frame at a side of said track into which the operator feeds said articles,
   a feed wheel,
   a drive means to power said feedwheel,
   support means supporting said feedwheel and drive means at one side thereof only on said frame,
   an idler wheel below said feedwheel and means supporting said idler wheel on said frame,
   and means to move said drive wheel and said feedwheel relative to each other to provide a space between said feedwheel and said idler wheel,
   said feedwheel and idler wheel being rotatably supported to rotate on axis generally parallel to one another and perpendicular to said track
   a plate like shuttle blade adapted to move in a direction generally parallel to said axes to feed said articles out of said hopper and adjacent to said feedwheel onto said track when said feedwheel is moved away from said idler wheel,
   means to power said shuttle blade for feeding said articles individually from said hopper,
   said hopper having spaced upright side members and means on each said side member providing a space for receiving an end of said articles whereby said articles may be stacked in said hopper with each article received in said space,
   said side member providing a space adjacent the bottom thereof through which said shuttle blade can move, for moving an article from the bottom of said stack of articles to a position on said track between said idler and said feedwheel,
   means movably supporting said shuttle blade on said frame whereby said blade moves through said space.

2. The mechanism recited in claim 1 wherein said shuttle blade is adapted to slide through said space below said hopper and conveys an article out of said hopper adjacent to said feedwheel each time said shuttle blade moves toward said feedwheel.

3. The mechanism recited in claim 2 wherein said means for movably supporting said shuttle blade comprises:
   a first plate,
   said shuttle blade being fixed to said first plate,
   first gib means fixed to said first plate,
   a second plate,
   a first track attached to said second plate,
   said first gib means being slidably supported on said first track,
   second gib means fixed to said second plate,
   a second track attached to said frame,
   said second gib means slidably supported on said second track,
   whereby said shuttle blade can slide with said first track a predetermined distance and then said first track pushes said second gib a predetermined distance.

4. The mechanism recited in claim 3 wherein a lifting means is connected to said feedwheel to lift said feedwheel whereby said feedwheel is lifted providing a space between said idler and said feedwheel to allow an article to be moved by said blade from said hopper into said space between said feedwheel and said idler wheel.

5. The mechanism recited in claim 4 wherein a friction means is attached to the circumference of said feedwheel to contact said articles positioned between said feedwheel and said idler wheel to propel said articles.

6. The mechanism recited in claim 5 wherein said lifting means is connected to means on said feedwheel and said means to power said feedwheel comprises,
   a support fixed to said means to power said feedwheel and connected to a third slide means,
   a third track means fixed to said frame,
   a third gib means fixed to said means to support said motor,
   said third gib means being supported on and being adapted to slide along said third track means,
   said third track means being fixed to said frame and lying parallel to the direction of movement of said feedwheel and said lifting means,
   said third gib means being slidable upon said third track means when a force is exerted upon said support fixed to said lifting means.

7. The mechanism recited in claim 6 wherein said lifting force is exerted by an air cylinder.

8. The mechanism recited in claim 7 wherein said means to power said shuttle blade is an air cylinder.

9. The mechanism recited in claim 1 wherein said articles are electronic components supported on a strip of material.

10. The mechanism recited in claim 9 wherein a microswitch is provided to sense the position of said article to signal said shuttle blade to retract.

11. The mechanism recited in claim 10 wherein a timer is connected to said means to move said shuttle blade whereby said shuttle blade actuating mechanism is shut off if an article jams in said machine and fails to move from said hopper to said track for a predetermined time.

12. A mechanism used to feed articles into other process equipment, comprising, a frame having a track, a feedwheel and an idler wheel rotatably supported on said frame to rotate about axes generally perpendicular to said track, means to mount said frame on said process equipment, a hopper for a stack of said articles, means on said mechanism to move said drive wheel and said feedwheel to a position spaced from each other, a shuttle blade adapted to successively push the lower most of said articles out of said hopper and axially of said wheels and between said idler wheel and said feedwheel when said idler wheel and said feedwheel are moved to spaced position from one another, means to power said shuttle blade and means for movably supporting said shuttle blade on said frame, a means to detect interruptions of feed of said articles, and means in contact with said means to power said shuttle blade, to stop feeding process and to reverse said shuttle blade.

13. The mechanism recited in claim 12 wherein said means to detect jams in feeding is a microswitch.

14. The mechanism recited in claim 13 wherein said means to reverse said shuttle blade is a microswitch actuator.

15. A mechanism used to feed plate like articles onto a track to move said articles to other process equipment comprising, a frame, a track on said frame, a drive wheel above said track rotatable about axes perpendicular to the direction of said article on said track, a shuttle plate slidably supported on said frame, means mounting said other process equipment on said frame, a hopper on said machine adjacent a first side of said track, said hopper having legs adapted to receive plate like articles to be fed to said track, said hopper comprising spaced channels with spaced legs adapted to receive a stack of plate like articles, said legs terminating above the bottom of said hopper providing a space between said legs and said frame for the bottom article of said stack and for said blade to push bottom article toward said track, means to power said shuttle blade for reciprocating it in a direction parallel to said axes toward and away from said hopper and said track, said shuttle blade being supported on the side of said hopper remote from said track and adapted to move through said space below said legs of said channel toward said track, said drive wheel and said idler wheel being supported at the sides of said track remote from said hopper only providing an open space at the sides of said wheels adjacent said plate for plate like articles, and means to move said drive wheel from said idler wheel relative to each other providing a space between said drive wheel and said idler for said shuttle blade to move said articles and means to sense the position of an article moved by said shuttle blade into said space below said drive wheel and to move said drive wheel downward into engagement with said article.

16. The mechanism recited in claim 15 wherein an electric eye is said means to sense said articles being fed.

* * * * *